United States Patent
Sautter et al.

(10) Patent No.: US 8,387,839 B2
(45) Date of Patent: Mar. 5, 2013

(54) SPARE TIRE BIKE MOUNT

(75) Inventors: Chris Sautter, Portland, OR (US);
James Buckroyd, Portland, OR (US);
Zac Elder, Portland, OR (US)

(73) Assignee: Yakima Products, Inc., Beaverton, OR (US)

( * ) Notice: Subject to any disclaimer, the term of this patent is extended or adjusted under 35 U.S.C. 154(b) by 355 days.

(21) Appl. No.: 12/813,459

(22) Filed: Jun. 10, 2010

(65) Prior Publication Data

US 2011/0139844 A1 Jun. 16, 2011

Related U.S. Application Data

(60) Provisional application No. 61/186,305, filed on Jun. 11, 2009.

(51) Int. Cl.
*B60R 9/10* (2006.01)
(52) U.S. Cl. ............... 224/42.13; 224/510; 224/531; 224/532; 224/924
(58) Field of Classification Search ............ 224/42.13, 224/501–510, 518–521, 531, 532, 924; 211/17–22; 248/121, 122.1, 124.1, 125.9, 126, 220.21, 248/288.11, 291.1
See application file for complete search history.

(56) References Cited

U.S. PATENT DOCUMENTS

| | | | | |
|---|---|---|---|---|
| 4,948,021 A | * | 8/1990 | Murphy et al. | 224/42.13 |
| 5,050,785 A | * | 9/1991 | Hays | 224/511 |
| 5,085,360 A | * | 2/1992 | Fortune et al. | 224/42.13 |
| 5,372,287 A | * | 12/1994 | Deguevara | 224/510 |
| 5,526,971 A | * | 6/1996 | Despain | 224/519 |
| 5,803,330 A | * | 9/1998 | Stack et al. | 224/518 |
| 5,992,192 A | * | 11/1999 | Tual et al. | 70/233 |
| 6,695,185 B2 | * | 2/2004 | Church | 224/521 |
| 2006/0243769 A1 | * | 11/2006 | Lovey et al. | 224/517 |

FOREIGN PATENT DOCUMENTS

JP 07304395 A * 11/1995

\* cited by examiner

*Primary Examiner* — Justin Larson
*Assistant Examiner* — Adam Waggenspack
(74) *Attorney, Agent, or Firm* — Kolisch Hartwell, P.C.

(57) ABSTRACT

A rack for mounting on a spare tire assembly of a vehicle includes a mounting plate engagable to a spare tire mounting bracket of the vehicle, and a mast connected to the mounting plate in a substantially vertical position. The rack also includes a shoulder member connected proximate a top end of the mast and mountable proximate the top end of the mast using a connector at more than one position along a horizontal axis relative to the mast. A hub assembly is connected to the shoulder member, and a pair of arms are connected to the hub assembly that are configured to carry one or more bikes.

12 Claims, 6 Drawing Sheets

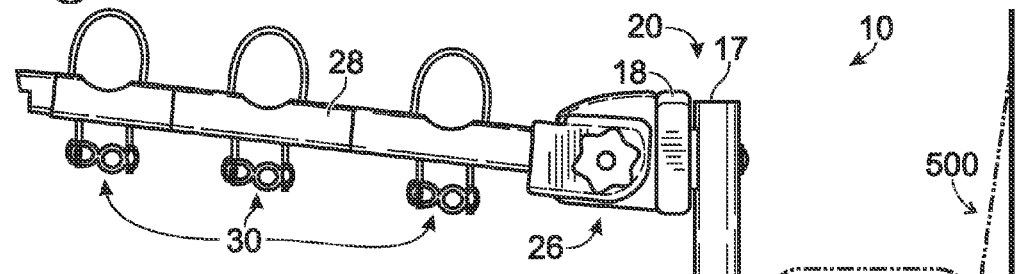
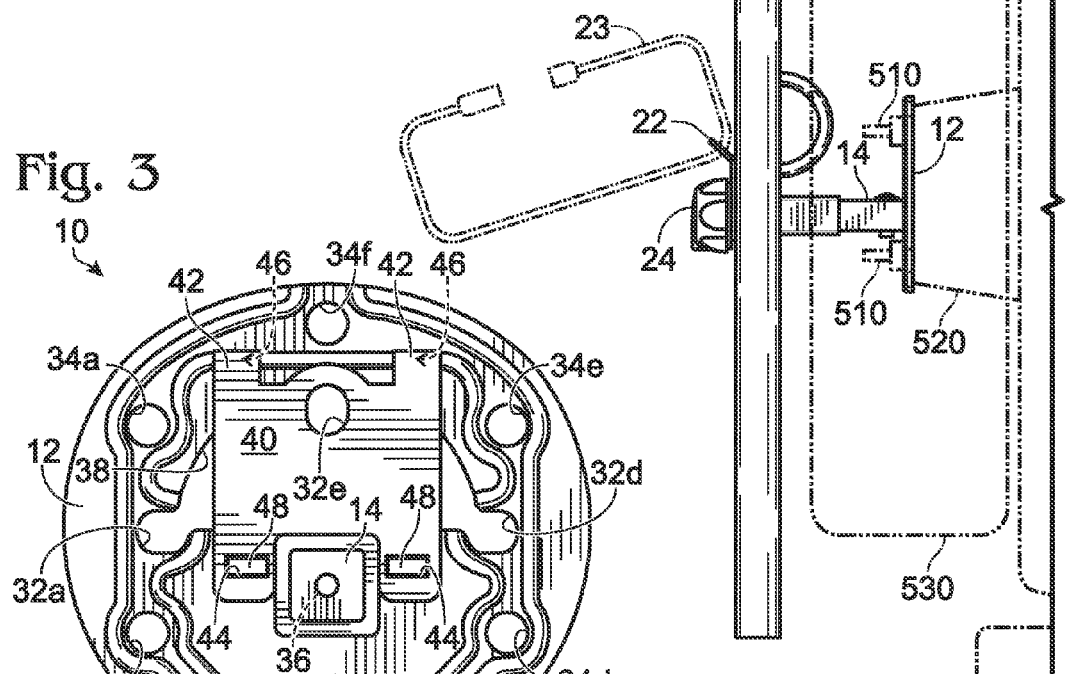
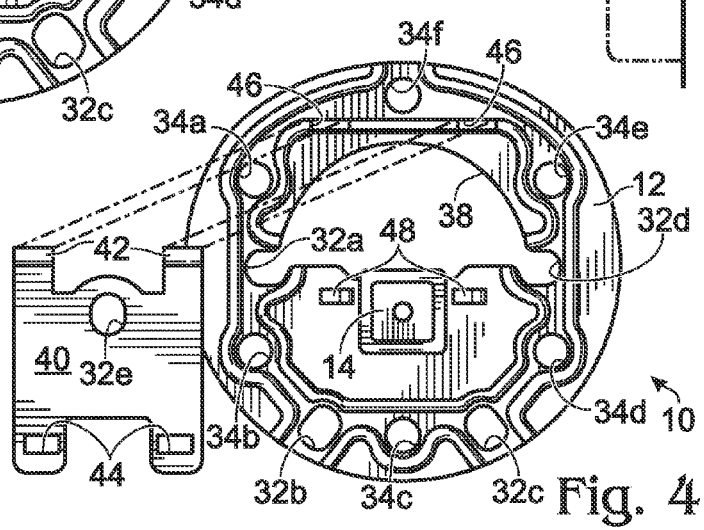

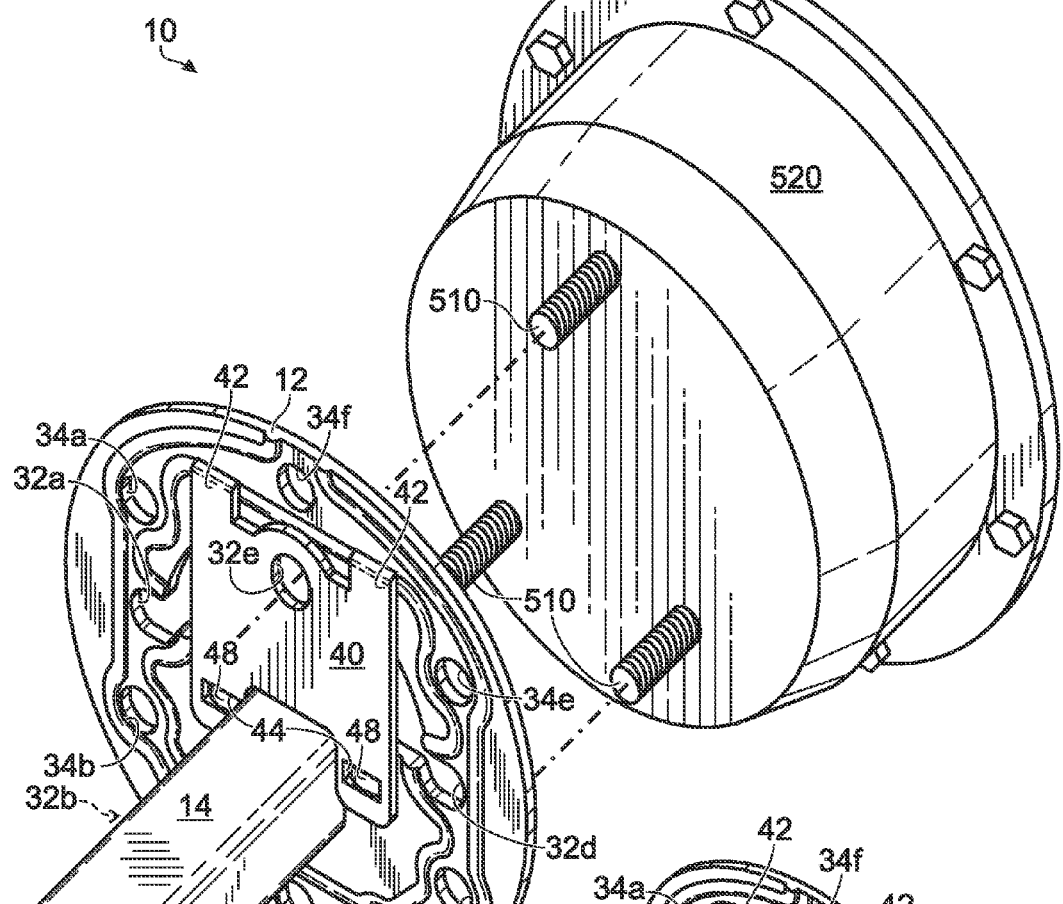
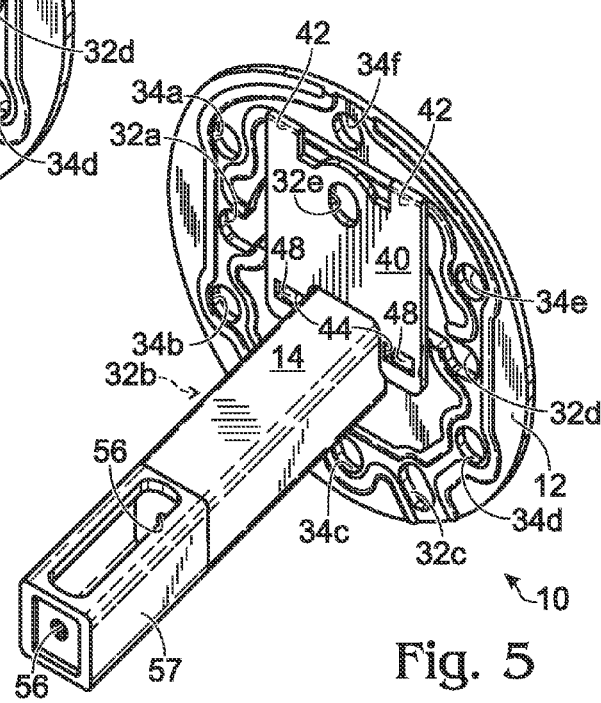

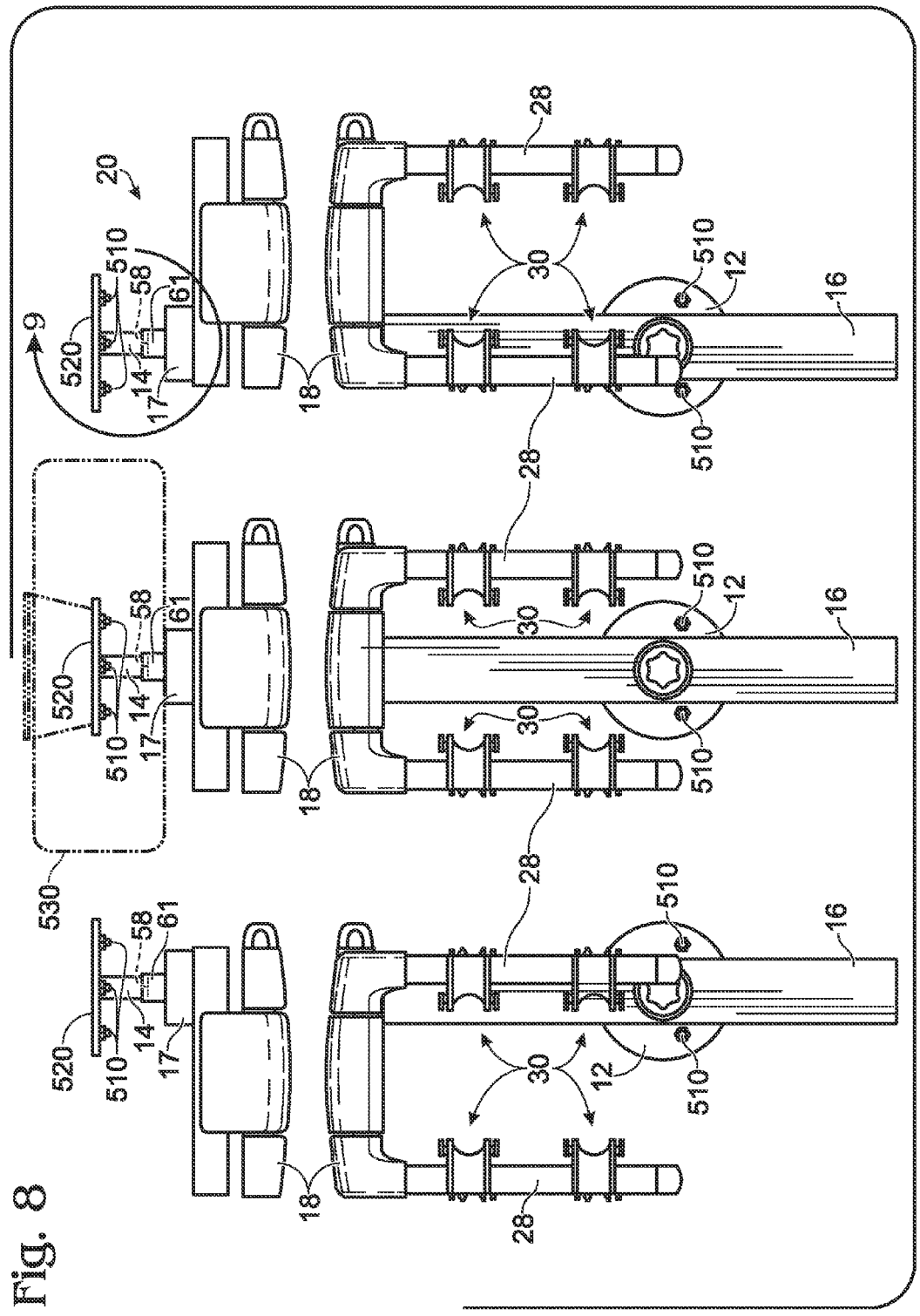

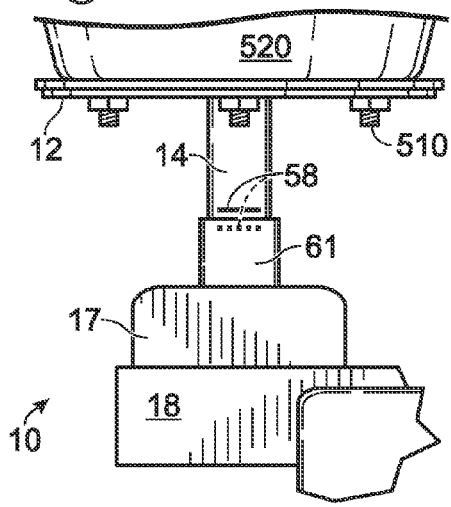
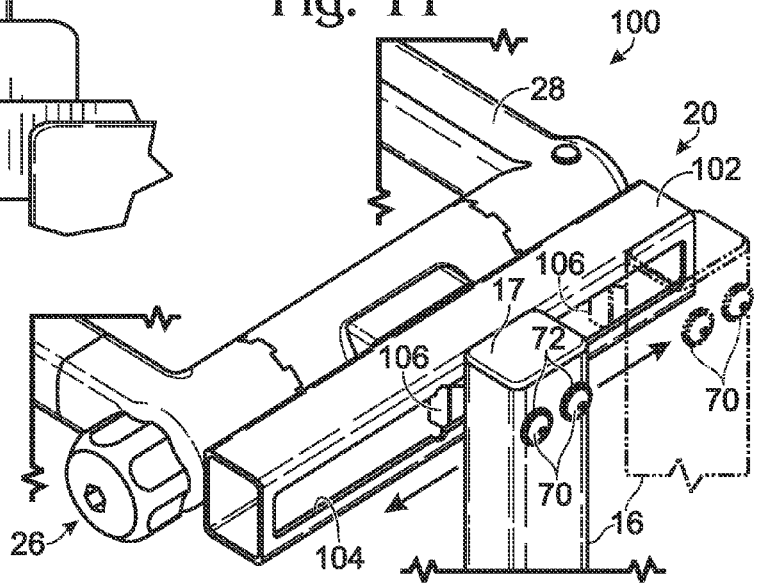
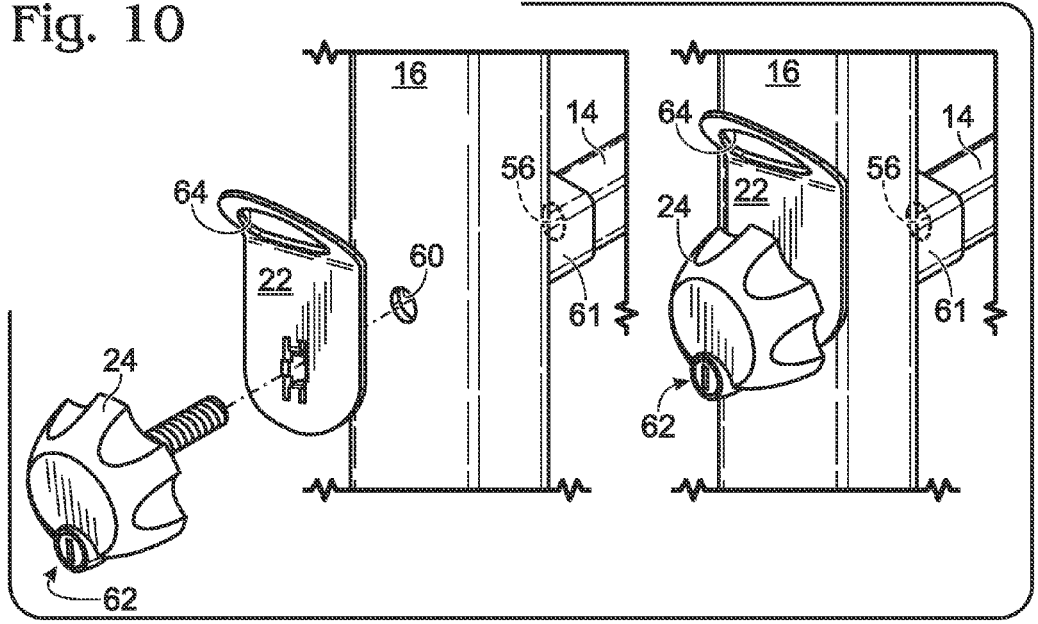

SPARE TIRE BIKE MOUNT

CROSS-REFERENCE TO RELATED APPLICATION

This application claims priority from U.S. Provisional Patent Application Ser. No. 61/186,305, filed Jun. 11, 2009 which is incorporated herein by reference. This application also incorporates by reference in their entireties for all purposes the following: U.S. Pat. No. 6,467,664 and U.S. Patent Publication Nos. US2009/0120985, US2009/0120986, and US2010/0127031.

BACKGROUND

The present disclosure relates to racks for carrying cargo such as bikes that may be mounted on a spare tire assembly behind a vehicle.

Many different types of racks are available for carrying cargo on the outside of a vehicle. Some racks are configured for attachment on top of a vehicle. Other racks are mounted on the rear of a vehicle, either to a hitch, trunk, or hatchback door. One type of rack is designed for attachment to a spare tire mounted on the back of a vehicle.

For example, Yakima offers a product known as the SPARE JOE bike rack that is a two bike spare mounted rack that straps onto the spare. A metal hoop wraps around the spare and a strap wraps below the spare. The Yakima Spare ROC is a two bike spare mounted rack that attaches to the vehicle's spare tire mounting bracket. A mounting plate is sandwiched between the bracket and the spare tire wheel. Lug nuts capture the spare tire and the mounting plate. The mounting plate has a stem that protrudes through the hole in the center of the wheel. The rack is attached to the mounting plate stem and is pressed against the spare tire above and below the wheel.

One of the problems with prior spare tire racks is that they are not versatile enough to fit different spare tire configurations. Often spare tire mounts are offset to one side or the other of the vehicle rear so the tire is not carried in the center of the vehicle rear. Bike racks typically should be centered on the back of the vehicle so that bikes do not extend beyond the sides of the vehicle. Another problem is that spare tire mounts of vehicles use different bolt mounting patterns. There is currently a standard five-bolt and six-bolt pattern employed on spare tire mounts of vehicles. One to five bolts may be arranged on the spare tire mount in the five-bolt pattern. One to six bolts may be arranged on the spare tire mount in the six-bolt pattern. Prior spare tire bike racks may not be adapted to fit both of these bolt mounting patterns. Additionally, some spare tire racks do not accommodate a big enough range of tire widths.

Accordingly, there is a need for new spare tire mountable bike racks that are adaptable to various different spare tire mounting systems and configurations.

SUMMARY

A rack system for mounting on a spare tire assembly of a vehicle may include a mounting plate having hole patterns that engage a spare tire mounting bracket of the vehicle and a mast connected to the mounting plate with a first connector. A rack system also may include a shoulder member connected at a top end of the mast with a second connector, a hub assembly connected to the shoulder member, and a pair of arms connected to the hub assembly that are configured to carry one or more bikes.

BRIEF DESCRIPTION OF THE DRAWINGS

FIG. 1 is a side view of a spare tire rack system with a pair of arms extended according to the present disclosure.

FIG. 2 is a perspective view of a mount plate of the spare tire rack system of FIG. 1 aligned with bolts of a spare tire mount of a vehicle.

FIG. 3 is a front view of the mount plate of FIG. 2 with a removable plate attached.

FIG. 4 is a front view of the mount plate of FIG. 2 with the removable plate unattached.

FIG. 5 is a perspective view of the mount plate of FIG. 2 with an extendible post connected to an extension piece.

FIG. 8 is a series of front and top-down views of different positions of a sideways bar relative to an upright bar of the spare tire rack system of FIG. 7.

FIG. 9 is a top down, cutaway view of the spare tire rack system of FIG. 8.

FIG. 10 is a series of perspective, cutaway views of a connector, a bracket with a loop, and the upright bar of the spare tire rack of FIG. 1.

FIG. 11 is a perspective view from behind, of another embodiment of a sideways bar slidably connected to an upright bar of a spare tire rack system according to the present disclosure.

DETAILED DESCRIPTION

Figure 6:
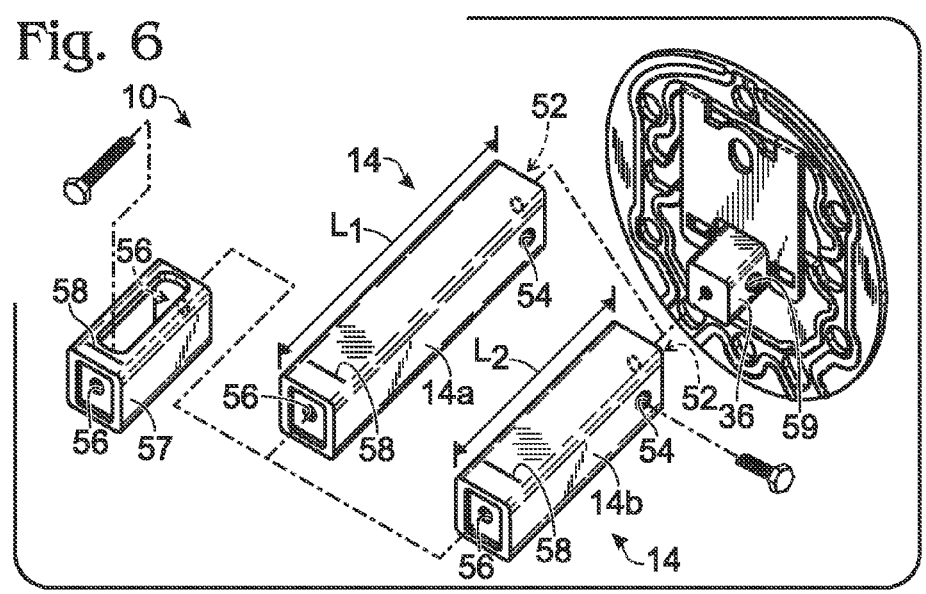
FIG. 6 is a perspective view of the mount plate of FIG. 2 showing extendible posts of different lengths and the extension piece.

FIG. 1 shows that rack system 10 may include mounting plate 12 that mounts to vehicle 500, such as to bolts 510 of a spare tire mounting bracket 520 of vehicle 500. Extendible post 14 may extend through a portion of spare tire 530 to connect mounting plate 12 to upright bar (or mast) 16, which may be connected at or near top end 17 to sideways bar (or shoulder portion) 18. Offset mechanism 20 may control the adjustability of sideways bar 18 relative to mounting plate 12 and/or vehicle 500. System 10 may also include bracket 22 for connecting to a security cable 23 and connector 24 for securing upright bar 16 to mounting plate 12. One or more hub assemblies 26 may be connected to sideways bar 18 to control movement of arms 28 between extended and retracted positions. One or more bike mount assemblies 30 with straps may be provided on arms 28 for supporting one or more bicycles.

As shown in FIGS. 2 and 3, mounting plate 12 may be configured to mount on spare tire mounting bracket 520. Mounting plate 12 may include first pattern of holes 32a-e, second pattern of holes 34a-f, stem 36 (best seen in FIG. 6), and open space 38 above stem 36 over which removable plate 40 may be positioned.

Mounting plate 12 may include features that allow rack system 10 to be used with various spare tire mounting bracket configurations of different vehicles. For example, the one or more hole patterns of mounting plate 12 may be configured so that mounting plate 12 can fit with various, standard types of spare tire mounting brackets 520 found on different vehicles 500. To increase versatility, first pattern of holes 32a-e may be a five-hole pattern and second pattern of holes 34a-f may be a six-hole pattern. Each hole may be sized to accept a portion of bolts 510. First hole pattern 32a-e may be arranged on mounting plate 12 to correspond with the standard five bolt pattern on spare tire mounts used in the vehicle industry. Second hole pattern 34a-f may be arranged on mounting plate 12 to correspond with the standard six bolt pattern on spare tire mounts used in the vehicle industry. Some embodiments of rack system 10 may employ less or more holes or patterns of holes.

Moreover, first hole pattern 32a-e may not be concentric with second hole pattern 34a-f on mounting plate 12. In other words, first hole pattern 32a-e and second hole pattern 34a-f may be arranged on mounting plate 12 such that each has a different central point relative to mounting plate 12. First hole pattern 32a-e may be arranged on mounting plate 12 centered around stem 36. Second hole pattern 34a-f may be arranged on mounting plate 12 so that holes 34a-f are centered at a position above the top edge of stem 36. In some embodiments, the first and second hole patterns may be concentric. In some embodiments, more (or less) than two hole patterns may be present.

For some vehicles, one or more holes of first pattern 32a-e may be engaged to one or more bolts 510. For some vehicles, one or more holes of first pattern 32a-e may be engaged to one or more bolts arranged in the standard five bolt pattern on spare tire mounts used in the vehicle industry. For some vehicles, one or more holes of second pattern 34a-f may be engaged to one or more bolts 510. For some vehicles, one or more holes of second pattern 32a-f may be engaged to one or more bolts arranged in the standard six bolt pattern on spare tire mounts used in the vehicle industry. Indeed, any combination of holes 32a-e and 34a-f may be engaged depending on the configuration of bolts 510, which may differ from vehicle to vehicle.

For example, FIG. 2 depicts one possible configuration of a vehicle 500 in which bolts 510 engage holes 32b, c, and e of the first hole pattern. In this configuration, and as shown in FIG. 3, removable plate 40 includes hole 32e. Removable plate 40 is attached to mounting plate 12 with a pair of hinges 42 and protrusion receiving slots 44 that correspond with, and attach to, hinge receiving slots 46 and protrusions 48 of mounting plate 12. When so attached, hole 32e of removable plate 40 may be arranged as part of first hole pattern 32a-e. In some embodiments, removable plate 40 may include one or more holes of the first and/or second (or other) hole pattern(s). In some embodiments, hole 32e may be directly on mounting plate 12.

FIG. 4 shows mounting plate 12 with removable plate 40 unattached. In some circumstances, some vehicles may have spare tire mounting brackets that are engagable with second hole pattern 34a-f and that may have one or more protrusions that would interfere with hole 32e of the first hole pattern. Exposing open space 38 by un-attaching removable plate 40 may allow the necessary clearance for accommodating the protrusion while bracket 520 is engaged with second hole pattern 34a-f.

Even with removable plate 40 un-attached, mounting plate 12 may be engaged to bolts 510 using any of holes 32a-d of the first hole pattern, or any of holes 34a-f of the second hole pattern.

It will also be appreciated that mounting plate 12 may be positioned onto spare tire mounting bracket 520 in any position so desired. As an example, mounting bracket 12 may be positioned so that hole 34c is at the 6 o'clock position (such as in FIGS. 1 and 2). Mounting bracket 12 may also be positioned onto mounting bracket 520 so that hole 34c is at the 3, 9, or 12 o'clock positions, or any other position desired.

Now turning to FIGS. 5 and 6, it can be seen that rack system 10 may include extendible post 14 for connecting mounting plate 12 to upright bar 16 by extending through a spare tire 530 of vehicle 500 (see also FIG. 1). As shown in FIG. 6, extendible post 14 may have open end 52, one or more side holes 54, and an end with hole 56. Open end 52 engages stem 36 to secure extendible post 14 to mounting plate 12. When engaged, side holes 54 are aligned with hole 59 of stem 36. A connector, such as a screw, can be inserted through aligned side hole 54 and hole 59 for securing extendible post 14 to mounting plate 12. In some embodiments, extendible post 14 may have more than one side hole 54 that can align with more than one hole 59 of stem 36 for receiving connectors for additional securement.

Extendible post 14 can also be of various lengths, which may allow for using rack system 10 with a large range and width of spare tires 530. For example, FIG. 6 depicts an extendible post 14a with a length $L_1$ that is greater than a length $L_2$ of an extendible post 14b.

As also shown in FIGS. 5 and 6, an extension piece 57 having ends with holes 56 may be connected to extendible post 14 to extend the length to adjust for wider wheels. A connector such as a screw can be inserted through an open space of extension piece 57 through hole 56 of extension piece 57 and the aligned hole 56 of extendible post 14 to secure piece 57 to post 14.

Turning to FIG. 9, extendible post 14 (and/or extension piece 57) may include indicia 58. Extendible post 14 (and/or extension piece 57) may need to extend a certain distance beyond all or a portion of bolts 510, and/or mounting bracket 520, and/or spare tire 530 to allow enough clearance for attaching upright bar 16 to extendible post 14 (or extension piece 57). Indicia 58 can be used to indicate if the desired clearance is achieved. For example, if indicia 58 does not extend beyond bolts 510, then a longer extendible post 14 and/or an extension piece 57 may be employed to allow upright bar 16 the needed clearance to attach to extendible post 14 (or extension piece 57).

In some embodiments, indicia 58 may indicate a proper seated position for attaching upright bar 16 to extendible post 14 (or extension piece 57) where upright bar 16 is in a position to be tightened to sit with pressure against spare tire 530. When upright bar 16 is attached to extendible post 14 (or extension piece 57), then indicia 58 being covered by a portion of upright bar 16 (and therefore hidden from view as shown by dashed line 58) may indicate that the proper seated position has been achieved. If indicia 58 is still visible after extendible post 14 is connected to upright bar 16, then this may indicate a longer extendible post 14 (or extension piece 57) may be needed to achieve the proper seated position.

As shown in FIG. 10, upright bar 16 may include hole 60 and female receive 61 that receives an end of extendible post 14 (or extension piece 57) with hole 56. Connector 24 is then inserted through hole 60 and hole 56 of extendible post 14 (or extension piece 57) to secure the components together. Connector 24 can be a screw with a handle. Connector 24 may also include locking mechanism 62. Locking mechanism 62 can be secured to prevent theft of rack system 10. Female receiver 61 may cover indicia 58 to indicate upright bar 16 is in the proper seated position (see FIG. 9).

In some embodiments, bracket 22 with loop 64 may be interposed and/or secured between connector 24 and upright bar 16. A security cable 23 can be looped through loop 64 and used to secure one or more bikes (or other objects) positioned on arms 28 (see FIG. 1). Security cable 23 can have a locking mechanism at one end to lock the looped security cable. Security cable 23 can be a standard cable bike lock, or a chain whose ends are secured together with a lock, such as a padlock or key-lock. Locking both security cable 23 and locking mechanism 62 of connector 24 can prevent theft of a bike from rack system 10.

Figure 7:
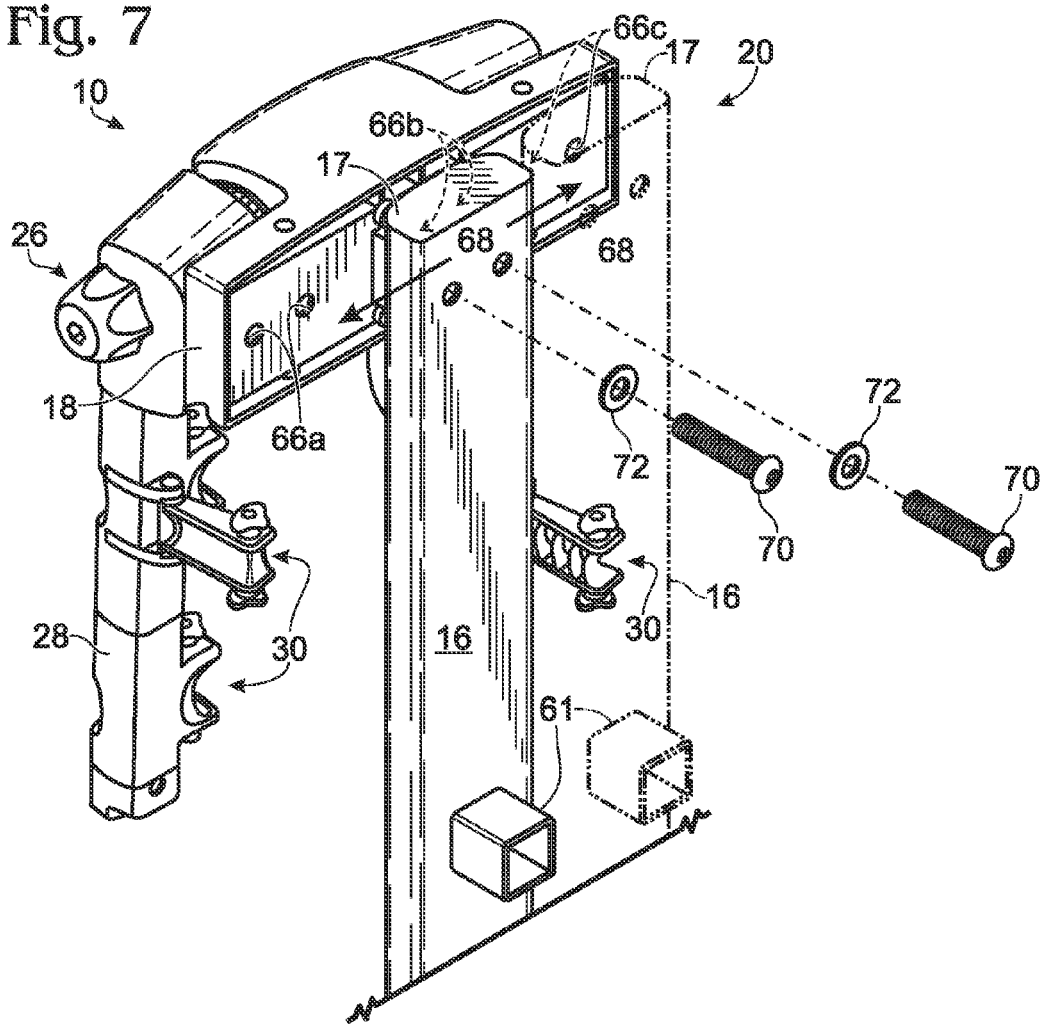
FIG. 7 is a perspective view from behind, of an upright bar connected to a sideways bar of the spare tire rack system according to the present disclosure.

Turning back to FIGS. 7 and 8, rack system 10 may include an offset mechanism 20 that allows for adjusting the position of sideways bar (or shoulder) 18 and/or arms 28 relative to mounting plate 12 and/or the vehicle. Offset mechanism 20 may allow for substantially horizontal adjustment of sideways bar 18 and/or arms 28 relative to mounting plate 12 and/or upright bar 16 and/or the vehicle.

Sideways bar 18 may be mounted proximate a top end 17 of upright bar (or mast) 16. Sideways bar 18 may include three pairs of holes 66a, 66b, 66c that align with a pair of holes 68 that extend through upright bar 16 proximate top end 17. Connectors 70 and washers 72 can be used to secure upright bar 16 to sideways bar 18 through aligned holes 68 and any pair of holes 66a, 66b, or 66c. As shown by the arrows and dashed depiction in FIG. 7, and in FIG. 8, sideways bar 18 and arms 28 may be secured to upright bar 16 in any one of three discrete positions. Hub assembly 26 allows for extension and retraction of arms 28. In this way, sideways bar 18 and arms 28 can be positioned relative to mounting plate 12 and/or upright bar 16 and/or vehicle 500 as so desired.

In some embodiments, more (or less) holes or pairs of holes 66a, 66b, 66c may be added (or removed) along a horizontal axis of sideways bar 18 depending on how many discrete securement positions are desired. Any appropriate connector 70 (e.g., bolt, screw, a locking connector such as connector 24 with or without locking mechanism 62, etc.) can be used. In some embodiments, only one hole, or more than two holes, could be used instead of a pair of holes 66a, 66b, 66c and 68 for securing upright bar 16 to sideways bar 18.

FIG. 11 shows another embodiment of rack system 100, which is similar to rack system 10, except as part of offset mechanism 20, sideways bar 102 includes track 104 into which track engager portion 106 of upright bar 16 extends. Track 105 may extend substantially horizontally or sideways. Track 104 and track engager portion 106 may allow upright bar 16 and sideways bar 102 to remain connected even when connector 70 is unconnected from bars 16 and 102. As indicated by the arrows and dashed depiction in FIG. 11, arms 28 can be moved and/or centered relative to mounting plate 12 and/or upright bar 16 and/or the center of the vehicle rear by sliding sideways bar 102 relative to upright bar 16 to the desired position. Upright bar 16 may be moved to any desired position within sideways track 104. Connector 70 or any other connector or tightener can be employed to secure the bars 16, 102 in the desired position.

Figure 12:
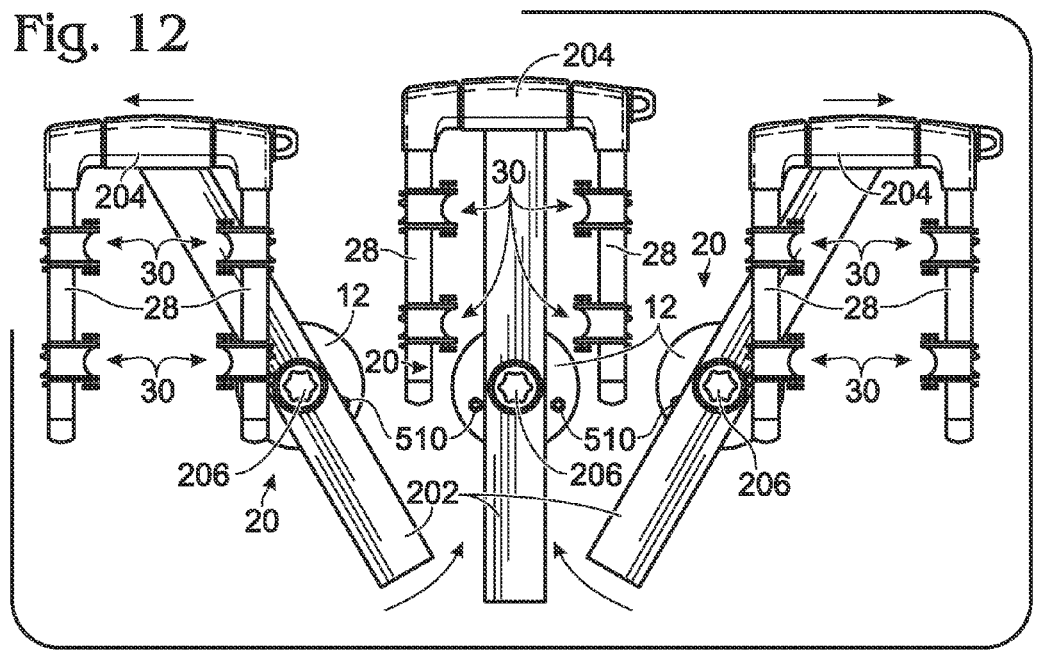
FIG. 12 is a series of front views of another embodiment showing different positions of a sideways bar relative to an upright bar of a spare tire rack system, with the arms retracted, according to the present disclosure.

FIG. 12 shows another embodiment of rack system 200, which is similar to rack system 10, except that upright bar (or mast) 202 in this embodiment can be angled or rotated to position arms 28 and/or sideways bar 204 relative to mounting plate 12. Upright bar 202 may be pivoted about a middle portion of upright bar 202 near connector 206. Connector 206 may be used to secure upright bar 202 in the desired position relative to mounting plate 12 and/or the center of the vehicle rear. Rack system 200 may also include a rotating mechanism (not shown) that allows sideways bar 204 to remain substantially parallel with the ground when upright bar 202 is secured at a pivoted or angled position. As such, arms 28, when in the extended position, may remain substantially parallel with the ground so that one or more bikes can be attached and carried on rack system 200 when upright bar 202 is secured at a pivoted or angled position.

Figure 13:
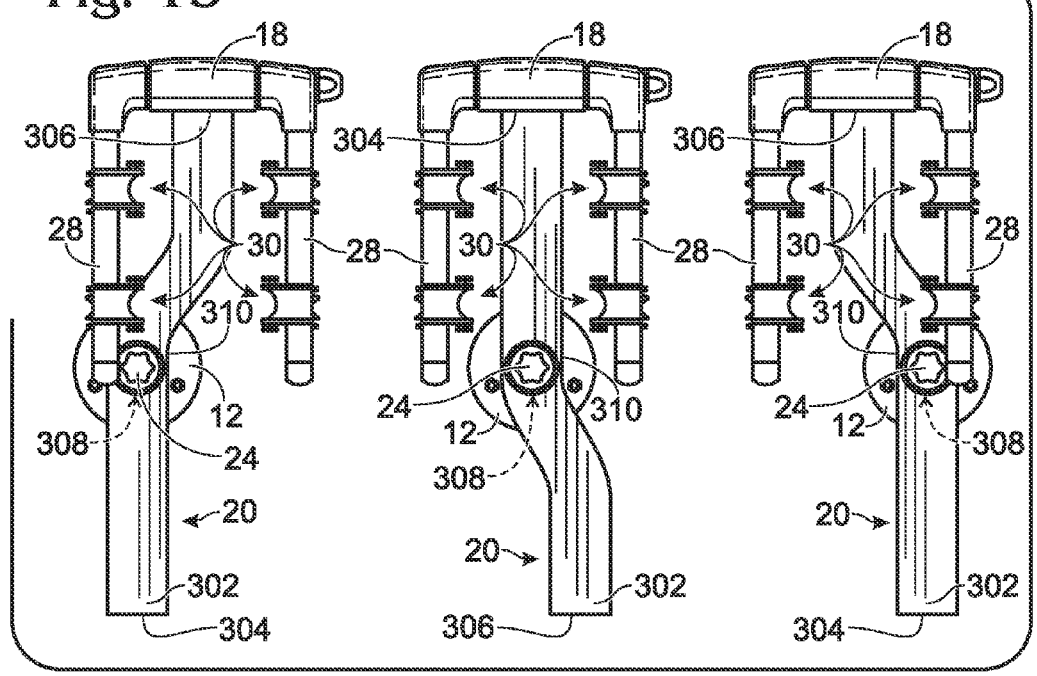
FIG. 13 is a series of front views of another embodiment showing different positions of a sideways bar relative to a shaped, upright bar of a spare tire rack system, with the arms retracted, according to the present disclosure.

FIG. 13 shows another embodiment of rack system 300, which is similar to rack system 10, except that upright bar 302 of rack system 300 includes a jog or substantial s-shape. Upright bar 302 may be shaped, jogged, or substantially s-shaped between first end 304 and second end 306 of upright bar 302. Upright bar 302 may have opening 308 proximate or at middle portion 310 of upright bar 302 that receives connector 24. Upright bar 302 may be substantially linear between first end 304 and middle portion 310. Upright bar 302 may curve sideward and upward starting at middle portion 310 towards second end 306. Either first end 304 or second end 306 of upright bar 302 may be connected to sideways bar 18 with connector 70 (not shown). As such, the orientation of upright bar 302 can be flipped or twisted relative to sideways bar 18 so that arms 28 are centered, to the left, or to the right of mounting plate 12, as so desired. Connector 70 or any other connector or tightener can be employed to secure the bars 18, 302. Arms 28, when in the extended position, may remain substantially parallel with the ground so that one or more bikes can be attached and carried on rack system 300.

It should be appreciated that any of the components of rack systems 10, 100, 200, and/or 300 may be combined as desired. It should also be appreciated that, although the rack embodiments disclosed herein are designed primarily to carry bikes, other types of racks using the same basic spare tire attachment system components may be readily configured for carrying other types of cargo or objects, for example, skis, snowboards, cargo boxes, etc.

The present disclosure makes reference at times to directional orientation. Unless otherwise specified or defined herein, directional orientation may generally be as follows: a horizontal direction may indicate the direction that is perpendicular to the gravitational direction of the earth. A vertical direction may be the gravitational direction. A forward or rearward direction may indicate direction in accord with vehicle movement. Forward may mean in the direction of a vehicle moving forward, while rearward may mean in the direction of a vehicle moving in reverse.

The various structural members disclosed herein may be constructed from any suitable material, or combination of materials, such as metal, nylon, plastic, rubber, or any other materials with sufficient structural strength to withstand the loads incurred during use. Materials may be selected based on their durability, flexibility, weight, and/or aesthetic qualities.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications, and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

We claim:

1. A rack for mounting on a spare tire assembly of a vehicle, comprising:
    a mounting plate including a stem and having a first pattern of holes configured to receive bolts of a spare tire mounting bracket of a vehicle and also having a second pattern of additional holes configured to receive bolts of a spare tire mounting bracket of a vehicle, the mounting plate including a first plate member having a hole of the first pattern and attached to the stem and a removable plate member connected to the first plate member and having a hole of the first pattern, the holes of the first pattern are centered on the stem, the second pattern of holes is non-concentric with the first pattern and a rack assembly connected to the mounting plate.

2. The rack of claim 1, wherein the first pattern of holes is not concentric with the second pattern of holes.

3. The rack of claim 1, wherein the first pattern has five holes and the second pattern has six holes.

4. The rack of claim 1, wherein a hole of the first pattern is defined cooperatively by the first plate member and the removable plate member.

5. The rack of claim 1, wherein the first plate member defines an opening that is larger than the holes of each pattern and that overlaps a hole defined by the mounting plate, and wherein the removable plate member is disposed over the opening.

6. The rack of claim 1, wherein the removable plate member includes a hinge portion engagable with a hinge receiver of the first plate member.

7. The rack of claim 1, wherein the rack assembly includes a pair of arms configured to hold one or more bicycles.

8. A rack for mounting on a spare tire assembly of a vehicle, comprising:

a mounting plate including a stem and having a first pattern of five holes sized to receive bolts of a spare tire mounting bracket of a vehicle and also having a second pattern of six additional holes sized to receive bolts of a spare tire mounting bracket of a vehicle, the mounting plate including a removable plate member having a hole of the first pattern and attached over an opening of the mounting plate, the holes of the first pattern are centered on the stem, the second pattern of holes is non-concentric with the first pattern and a rack assembly connected to the mounting plate.

9. The rack of claim 8 wherein the center of the second pattern of holes is vertically above the center of the first pattern of holes.

10. The rack of claim 8, wherein the center of the stem is positioned below the center of the mounting plate, and the opening is positioned above the stem.

11. The rack of claim 8, wherein the removable plate member includes a hinge portion engagable with a hinge receiver of the mounting plate that is positioned adjacent the opening.

12. The rack of claim 8, wherein the rack assembly includes a pair of substantially parallel arms, and at least one mounting assembly with a strap mounted on at least one of the pair of arms and configured to secure one or more bicycles to the rack assembly.

* * * * *